United States Patent [19]
Strauss et al.

[11] Patent Number: 5,744,923
[45] Date of Patent: Apr. 28, 1998

[54] MICROPROCESSOR-BASED CONTROLLER FOR ACTUATOR MOTORS WITH CAPACITIVE POWER BACKUP AND METHOD THEREFOR

[75] Inventors: Jason Strauss; Michael Ginzburg, both of Fort Lauderdale, Fla.; Zev Kopel, Dollard des Ormeaux, PQ, Canada; Shu Yong Shao, Boca Raton, Fla.

[73] Assignee: National Environmental Products, Ltd., Inc., Pompano Beach, Fla.

[21] Appl. No.: 755,088

[22] Filed: Nov. 22, 1996

[51] Int. Cl.$^6$ .................................................. G05B 9/02
[52] U.S. Cl. ........................... 318/563; 318/430; 318/440; 318/467
[58] Field of Search .................................. 318/563, 609, 318/626, 256, 265, 266, 286, 430, 434, 440, 442, 466, 467, 468, 500; 388/903, 907.5, 909

[56] References Cited

U.S. PATENT DOCUMENTS

| | | | |
|---|---|---|---|
| 4,364,111 | 12/1982 | Jocz | 318/286 X |
| 5,034,671 | 7/1991 | Patton et al. | 318/560 |
| 5,278,454 | 1/1994 | Strauss et al. | |
| 5,422,808 | 6/1995 | Catanese, Jr. et al. | 318/563 X |
| 5,519,295 | 5/1996 | Jatnieks | |
| B1 5,278,454 | 1/1994 | Strauss et al. | |

*Primary Examiner*—Bentsu Ro
*Attorney, Agent, or Firm*—Robert C. Kain, Jr.

[57] ABSTRACT

The microprocessor based controller for the fractional horsepower actuator motor includes a capacitive power backup system. The motor is used as an actuator and is coupled to an air damper or valve. In the event of a loss of power to the controller, the controller must drive the air damper or valve to a predetermined, failsafe position. The capacitive energy source stores sufficient power to drive the motor and the coupled air damper or valve to the predetermined failsafe position. The controller includes a sensor for determining the presence or absence of power and generating a failsafe control signal. A switch receives the failsafe control signal and passes power from either the main power supply or the capacitive energy storage unit. The controller includes a microprocessor and a memory. During a failsafe operation, the microprocessor drives the motor and hence the air damper or valve to the failsafe position at full power. When the position of the air damper or valve falls within a predetermined position band near the failsafe position, the microprocessor reduces the drive signal applied to the motor in order to achieve a soft landing at the failsafe position. In another embodiment, the microprocessor will reverse the direction of the air damper or valve if the position of the damper or valve is within a further predetermined position band near the failsafe position. Thereafter, the microprocessor drives the air damper or valve via the motor to the failsafe position through the soft landing system.

40 Claims, 11 Drawing Sheets

MICROPROCESSOR-BASED CONTROLLER FOR ACTUATOR MOTORS WITH CAPACITIVE POWER BACKUP AND METHOD THEREFOR

The present invention relates to a microprocessor-based controller which controls a fractional horsepower actuator motor coupled to an air damper or a valve. These controllers include capacitive energy power backup systems that provide power to drive the motor, and hence the air damper or valve, to a predetermined failsafe position in the event main power supplied to the controller is lost. A method for controlling the fractional horsepower actuator motor is also part of this invention.

BACKGROUND OF THE INVENTION

Microprocessor-based controllers for fractional horsepower motors are known. Particularly, these fractional horsepower motors are utilized to drive air damper vents or valves. An example of a controller (not a microprocessor-based controller) for these types of actuators is disclosed in U.S. Pat. No. 5,278,454 to Strauss et al., issued Jan. 11, 1994, and subject to Reexamination Certificate No. B1,5,278,454, certificate issued May 23, 1995. The contents of the Strauss et al. patent is incorporated herein by reference thereto. U.S. Pat. No. 5,519,295 to Jatnieks also discloses a controller for actuator motors. The Jatnieks controller is not a microprocessor-based controller.

Microprocessor-based controllers for actuators are manufactured by Belimu.

The fractional horsepower motors may be alternating current AC or direct current DC drive motors. These motors are sometimes called low-output motors rather than fractional horsepower motors.

OBJECTS OF THE INVENTION

It is an object of the present invention to provide a microprocessor-based controller for actuator motors and a method therefor.

It is an additional object of the present invention to provide a controller and a method for controlling the actuator motor wherein the microprocessor drives the motor and the mechanically coupled damper or valve to a "soft landing" when the air damper or valve is close to its predetermined failsafe position.

It is a further object of the present invention to provide a controller and a method wherein the soft landing occurs during the failsafe operation of the system (when the main power supply has been withdrawn or lost) as well as during normal operation.

It is an additional object of the present invention to provide a controller and a method which, during failsafe operation, quickly reduces the drive applied to the motor (a "soft landing") if the position of the actuator and air damper or valve is within a predetermined position band near the predetermined failsafe position. During the failsafe operation, the capacitor power drives the actuator motor at full speed. This feature insures that the actuator does not break or destroy the mechanical coupling between the actuator motor and the air damper or the valve.

It is another object of the present invention to provide a reverse drive, during a failsafe operation, and prior to a forward drive to the failsafe position, if the initial position of the actuator is in a predetermined position band, in order to seat the air damper and valve correctly and fully in its failsafe position. The reverse drive position band may be larger, smaller or identical to the soft landing position band.

SUMMARY OF THE INVENTION

The microprocessor-based controller for the fractional horsepower actuator motor includes a capacitive power backup system. The motor is used as an actuator and is coupled to an air damper or valve. In the event of a loss of power to the controller, the controller must drive the air damper or valve to a predetermined, failsafe position. For example, this predetermined failsafe position may be a fully open air damper or vent position, a fully closed air damper or vent position, an intermediate position (as directed by the designer of the building or HVAC [heat, ventilation and air conditioning] system), or may be an open, closed or intermediate position for the valve. The capacitive energy source stores sufficient power to drive the motor and the coupled air damper or valve to the predetermined failsafe position. The controller includes a sensor for determining the presence or absence of power and generating a failsafe control signal when power is lost. A switch directly or indirectly receives the failsafe control signal and passes power from either the main power supply or the capacitive energy storage unit based upon the absence or presence of the failsafe control signal, respectively. The controller includes a microprocessor and a memory storing computer programs governing the operation of the controller. During a failsafe operation, the microprocessor drives the motor and hence the air damper or valve to the failsafe position at full power with electrical power supplied by the capacitive energy source. When the position of the air damper or valve falls within a predetermined position band near the failsafe position, the microprocessor reduces the drive signal applied to the motor in order to achieve a soft landing at the failsafe position. In another embodiment, the microprocessor will reverse the direction of the air damper or valve if the position of the damper or valve is within a further predetermined position band near the failsafe position. Thereafter, the microprocessor drives the air damper or valve via the motor to the failsafe position through the soft landing system.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to a microprocessor-based controller for a fractional horsepower motor. The controller includes a capacitive power backup system which supplies power to the actuator motor to drive the attached air damper or valve to a failsafe position in the event the main power supply is lost. A method for controlling the actuator motor is also disclosed.

Figure 1:
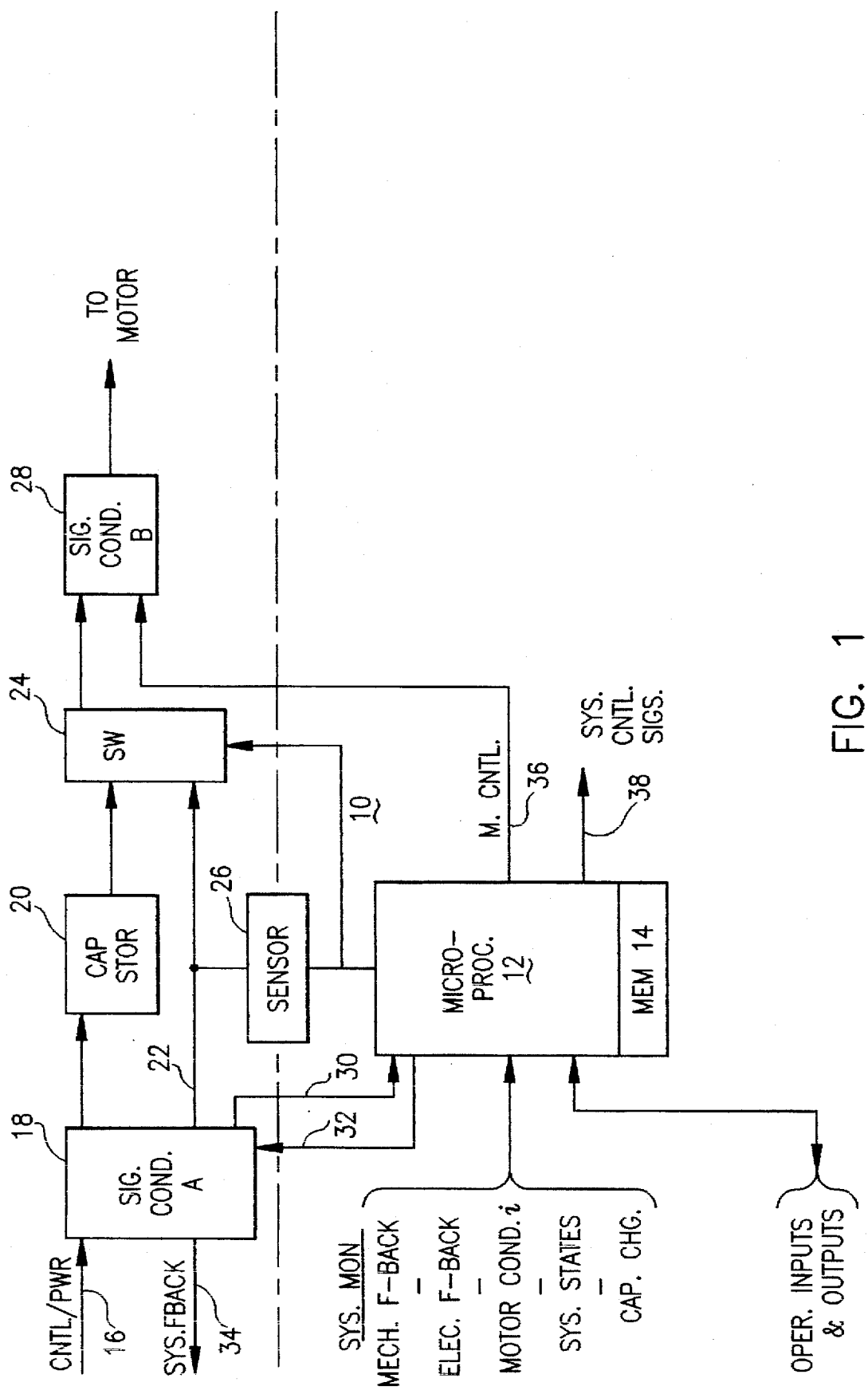
FIG. 1 diagrammatically illustrates a high level, functional block diagram of the microprocessor-based controller in accordance with the principles of the present invention.

FIG. 1 diagrammatically illustrates, in block diagram form, the major system features for the microprocessor-based controller. Controller 10 includes a microprocessor 12 having a memory 14. In one preferred embodiment, microprocessor 12 (sometimes identified as a microcontroller) includes internal analog to digital convertors and is a PIC16C73 microchip in one working embodiment. This microprocessor 12 includes 128 bytes of random access memory RAM, a watchdog timer and three programmable counters. Microprocessor 12 is an RISC based programming unit.

Typical actuator systems are supplied with control and power signals as diagrammatically illustrated on input line 16. These power and control input signals are applied to signal conditioner A 18. The power signals are regulated, smoothed, filtered and modified, and some of those signals are applied to a capacitive energy storage unit 20. Other power signals are applied on line 22 to a switch 24 and a sensor 26. The output of the capacitive storage unit is also applied to switch 24. The output of switch 24 is applied to signal conditioner B 28. The output of signal conditioner B is applied to the motor. The motor is mechanically attached to an air damper or valve as shown in U.S. Pat. No. 5,278,454 to Strauss et al., incorporated herein by reference thereto.

Sensor 26 is connected to microprocessor 12 and further microprocessor 12 is connected to switch 24. Signal conditioner A 18 also includes an output to microprocessor 12 via line 30. Microprocessor 12 generates a system feedback output signal on line 32 that is applied to signal conditioner A. This system feedback signal is applied to other components outside of the controller as noted on line 34.

The microprocessor 12 generates motor control signals on line 36 and these motor control signals provide instructions to the signal conditioner B regarding motor direction and speed (and/or power).

Microprocessor 12 monitors various system conditions. The microprocessor monitors a mechanical feedback signal from the motor, an electrical feedback signal from the motor, a current utilized by the motor while it drives the air damper or valve (herein motor load current i), monitors various system states and also monitors the charge on capacitive energy storage unit 20. Microprocessor 12 also receives input from the operator establishing certain parameters and control configurations as well as generates certain outputs for the operator such as LED (light emitting diode) driver signals. Other types of operator inputs and outputs could be utilized particularly, but not limited to, a digital output port through an RS232 connector. Microprocessor 12 generates certain system control signals on line 38.

As explained in detail hereinafter, sensor 26 continually monitors whether power is being supplied to the controller circuit. In the absence of power on line 16, sensor 26 generates a failsafe control signal. This failsafe control signal trips or changes the state of switch 24. When switch 24 changes states, energy to drive the motor is supplied by capacitive energy storage unit 20 via switch 24, signal conditioner B, and ultimately to the motor. Further, sensor 26 may be coupled to microprocessor 12 and the microprocessor may generate the failsafe control signal and trip or change the state of switch 24. As an additional backup, microprocessor 12 monitors the power signal applied to signal conditioner A. This monitoring is embodied by line 30.

Microprocessor 12 monitors the position of the motor and hence the actuator as well as the air damper and the valve based on a mechanical feedback signal and an electronic feedback signal. The load on the motor is monitored by microprocessor 12 analyzing motor load current i. The load current is related to the power consumed by the motor. Microprocessor 12 could monitor other electrical parameters which correlate to the power consumption by the motor. The charge held by capacitive energy storage unit 20 is also monitored by the microprocessor 12. For example, if the charge in capacitive storage unit 20 does not exceed a charge threshold value, microprocessor 12 will not permit switch 24 to switch over to capacitor stored energy from the main power supply on line 22. In other words, microprocessor 12 has a delay which blocks the failsafe mode in the event capacitor storage 20 has not sufficiently charged the actuator motor to the failsafe position. Further, microprocessor 12 is configured such that when the position of the actuator is near the failsafe position, microprocessor 12 severely reduces the motor drive control signals on line 36 to slow down the motor such that the motor and the attached air damper and valve is driven to a soft landing near the mechanical end stops of the system. The failsafe position is normally near an end stop of the mechanical system.

With prior art devices, during failsafe operation, the capacitive energy storage unit 20 stores so much power and drives the motor so quickly to the failsafe position that the motor, the mechanical couplers, and/or the air dampers or valves are subject to undesirable mechanical stress and potential damage.

In other words, the capacitors in unit 20 store a great deal of energy and the controller moves the motorized system quickly to the failsafe position. The motor is driven at full speed based on the capacitor's stored energy. At or near the designated failsafe position, the actuator motor must be slowed down and its power reduced such that the motor and the mechanical couplings do not "crash" against the mechanical end stops of the system. Since these actuators and controllers are mounted at numerous remote locations throughout a building in the HVAC system, when the controllers fail, it is difficult to locate the failed controller and to replace it. Damage to the air dampers or vents and/or valves is unusual since the mechanical couplers between the motor and the air damper of valve are designed to fail first. Accordingly, it is important that the controllers quickly drive the motors and hence the air dampers or valves to the failsafe position but further, when the controllers do operate in the failsafe mode, that the controllers not break the mechanical coupling between the motor and the air damper or valve.

The present invention avoids these problems associated with prior art devices in that during failsafe operation, the microprocessor 12 the mechanical feedback signal and electrical feedback signal as well as the motor load current i. When these feedback signals meet certain thresholds (stored in memory 14), the microprocessor severely reduces the control drive and power signal supplied to signal conditioner B and ultimately to the motor. This achieves a "soft landing" at the failsafe position for the motor, the intermediate couplers and the air damper or coupled valve. In addition, in the present invention, when the position of the actuator is within a predetermined band near the failsafe position, the microprocessor reverses the direction of the actuator to "back off" the air damper or valve from the target position prior to moving the air damper and valve to the predetermined failsafe position. Thereafter, the actuator motor is driven to the failsafe position.

It is important to note that controller 10 can be configured as independent, discrete electrical components or may be configured in a single integrated circuit. Signal conditioner 18 includes various voltage regulators, filters, power supplies and possibly analog to digital and digital to analog converters. Sensor 26 may be a relay, may be a voltage divider circuit, or may be a digital sensing system which monitors the power supply to controller 10. Further, switch 24 may be a relay or may be a solid state transistor switch. The capacitive storage unit 20 is discussed in detail hereinafter. The signal conditioner B sending motor drive signals and directional signals to the motor may also be part of the integrated circuit or may be a discrete circuit component. As stated earlier, microprocessor 12 may generate the failsafe control signal rather than having that signal generated by sensor 26. Also, in addition thereto, sensor 26 could generate a first failsafe control signal and in the absence of that first failsafe control signal the microprocessor 12 could generate a second or supplemental failsafe control signal in order to insure that power is supplied during the failsafe mode. The capacitive energy storage unit 20 continues to supply power to the electronic system even after the air damper or valve has been moved to the predetermined failsafe position. As explained later, after failsafe positioning, microprocessor 12 withdraws the motor control signal from signal conditioner B, thereby isolating the motor from the continual application of drive signals. Thereafter, the electronic circuit continues to be powered by the capacitive energy storage unit 20.

Figure 2:
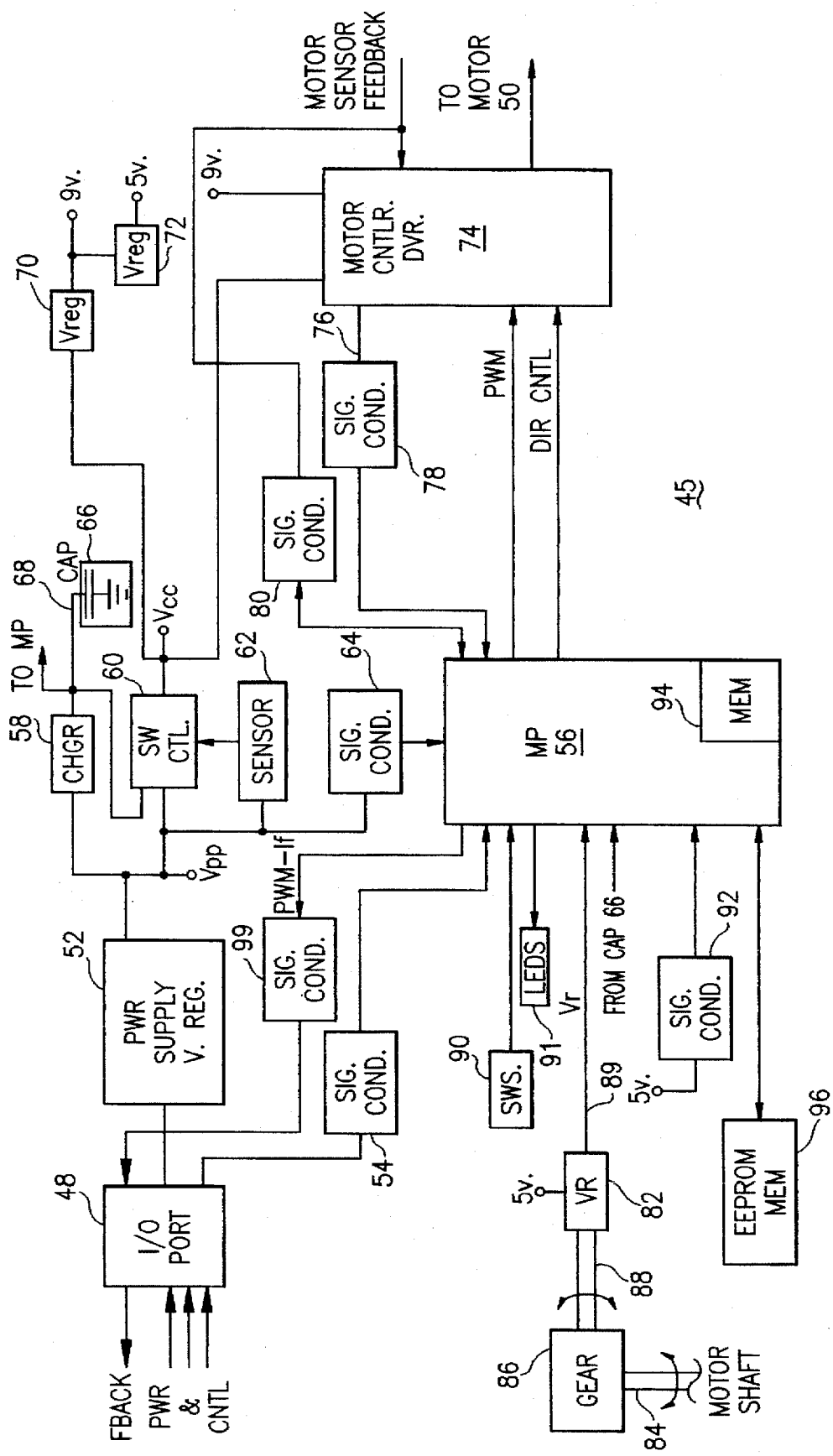
FIG. 2 diagrammatically illustrates the microprocessor-based controller, in block diagram form, showing additional features in accordance with the principles of the present invention.

FIG. 2 diagrammatically illustrates a detailed system embodying the present invention. The microprocessor-based controller 45 shown in FIG. 2 includes an input/output port 48. Port 48 accepts power and control input signals and ultimately those power and control input signals are utilized to move motor 50. The Input/Output Port Table that follows provides examples of signals commonly input into input/output port 48.

| Input/Output Port Table | |
| --- | --- |
| Pin 1 | Ground |
| Pin 2 | Power input signal |
| Pin 3 | Current or clockwise input signal |

| Input/Output Port Table | |
| --- | --- |
| Pin 4 | Counter-clockwise input signal |
| Pin 5 | Feedback output signal (F-Back) |

The present controller system can be configured to accept various power and control signals. Sometimes, those power and control signals are embodied as a single signal. Voltage levels above a predetermined threshold may represent clockwise directional control signals and the amplitude of the signal over the threshold could represent the commanded motor speed. Levels below the threshold may represent reverse or counterclockwise directional controls. Some systems are programmed to drive the motor at a single speed. Only directional commands are necessary in that system. Otherwise, power may be applied to pin 2 and the direction control signal could be applied to pin 3. That direction control signal may move the air damper or valve in a clockwise direction if the control signal is positive and may move the damper or valve in the counterclockwise direction when the control signal is negative. The following Power Control Signal Table provides some indication of the range of power and control input signals.

| Power - Control Signal Table |
| --- |
| 20–30 v. AC |
| 20–38 v. DC |
| High Voltage |
| Current |

The control input signals applied to input/output port 48 may be configured in many different signal formats. The following Input Control Signal Table provides some examples of these signal formats.

| Input Control Signal Table |
| --- |
| Current i 4–20 ma pulse width modulated (pwm) |
| Voltage 0–2 v phase cut modulated (partial sine wave) |
| Two position signal |
| Tri-state signal ON clockwise, OFF, ON counter-clockwise |

As an example, the controller 45 can be programmably configured by the operator to accept control signals configured as pulse width modulating signals having a current in a range within 4–20 ma. The width of the pulse determines how long the air damper or valve will move in the predetermined direction. The power and control input signals are established by industry standards.

The feedback Fback signal output from input/output port 48 is also an industry standard signal established for air damper actuators and valve actuators. If digital control signals are sent to controller 45, input/output port 48 would include a digital interface.

The power and control signal from port 48 is applied to power supply voltage regulator 52. Other control signals such as the directional and speed or power control signals are applied to a signal conditioner 54. The signal conditioner or conditioners for these signals may include amplifiers, filters, current to voltage convertors, or A/D converters. The output of signal conditioner 54 (which may be several outputs) is applied to microprocessor 56. In this manner, the power and control input signals are converted and regulated and the control input signals are supplied to microprocessor 56.

The output from power supply voltage regulator 52 is applied to a charge circuit 58, a switch 60, a sensor 62 and a further signal conditioner 64. Signal conditioner 64 includes a filter and a voltage divider circuit in one embodiment. Microprocessor 56 continually monitors the main power supply delivered to actuator controller 45. This main power supply $V_{PP}$ is the voltage primary power monitored by microprocessor 56 and by sensor 62. The output of sensor 62 provides a failsafe control signal which is supplied, in this embodiment, to switch 60 as a control signal. In another embodiment, microprocessor 56 could generate the failsafe control signal based upon an input from sensor 62 (not shown) or based upon its own analysis of $V_{PP}$. Conditioner 64 provides data for this analysis.

Switch 60 is supplied with power from power supply voltage regulator 52 as well as capacitive energy storage unit 66. Although a single capacitor is shown in capacitive energy storage unit 66, multiple capacitors could be utilized. As stated in U.S. Pat. No. 5,278,454 to Strauss et al., the capacitor or capacitor bank must have a high farad rating exceeding 0.045 farads as well as the relatively small (less than 30 cubic inches) size to fit within the size limits imposed on actuator systems. Capacitors meeting this farad rating and size include NEC capacitors sold under the trademark SUPERCAP as well as similar capacitors manufactured by Panasonic. The voltage on line 68 is equivalent to the capacitive energy stored in capacitive energy storage unit 66. Accordingly, the appropriate input to microprocessor 56 enables the microprocessor to monitor the amount of power stored in the capacitor. The voltage level is indicative of the amount of power stored in the capacitor. Other power monitors or sensors may be used.

The output of switch 60 is voltage $V_{CC}$. This voltage is applied to a voltage regulator 70 which develops a 9 volt power signal and a further voltage regulator 72 which develops a 5 volt power signal. The voltage $v_{cc}$ is also applied to motor controller driver 74. The 9 volt power is applied to controller driver 74. In the embodiment illustrated in FIG. 2, microprocessor 56 generates pulse width modulated PWM signals to driver 74 which provides an indication regarding the speed and amount of power to be supplied to the actuator motor. Microprocessor 56 also supplies a direction DIR control signal to driver 74. This indicates to the driver which direction the actuator motor should be driven. Driver 74 generates, as an internal circuit, a power consumption feedback signal on line 76. This feedback signal represents the combined current output for the three phases of the DC brushless motor which is utilized in one embodiment of the present invention. Signal conditioner 78 includes an amplifier, voltage divider, and possibly a filter. This feedback signal is the motor load current i. The motor load current i feedback signal is applied to microprocessor 56.

Various motors, either AC or DC, could be utilized in conjunction with the microprocessor-based controller. If a DC brushless motor is utilized, Hall effect sensors monitor the angular displacement or motion of the motor shaft. If other motors are used, different electrical or electromagnetic feedback devices or sensors could be utilized. The following Electrical Feedback Table provides some examples.

Electrical Feedback Table

Hall Effect sensors ... 3 pulses per revolution
Back EMF coil sensor

Figures 3, 4:
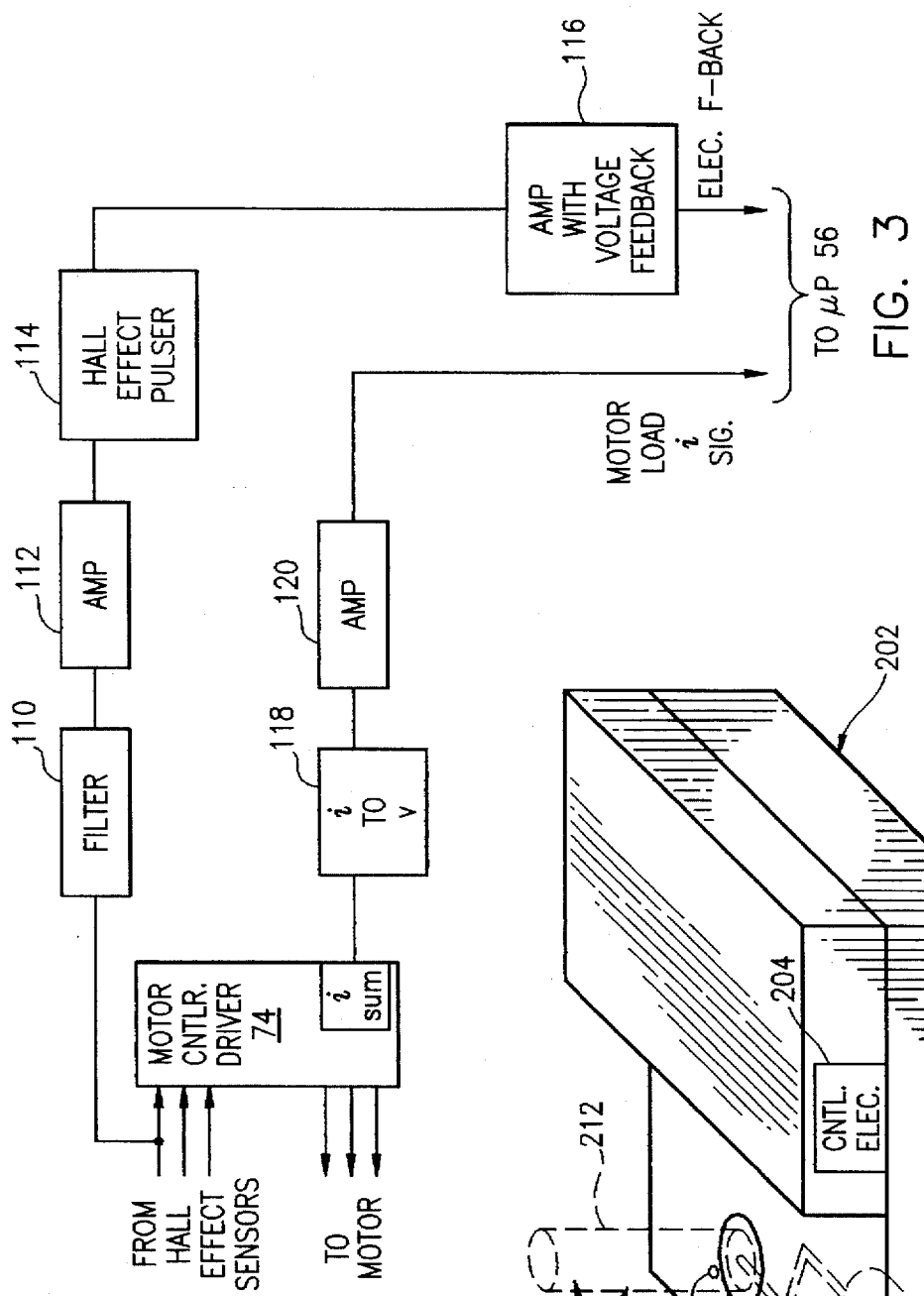
FIG. 3 diagrammatically illustrates the major components of an electrical feedback signal system which detects the position of the actuator motor and also illustrates the major components of a system to detect the motor load current which drives the motor.
FIG. 4 diagrammatically illustrates the major mechanical elements of the controller, the actuator motor, and the coupling to the air damper or valve.

If Hall effect sensors are utilized, the block diagram circuit shown in FIG. 3 illustrates the major components for processing the electronic feedback signal from those sensors. Although the Hall effect sensors have three feedback signals applied to driver 74, only one of those signal inputs is utilized. This signal input is applied to a filter 110 and the output of filter 110 is amplified by amplifier 112. The output of amplifier 112 is applied to a Hall effect pulser 114. This Hall effect pulser converts the pulses of current from the Hall effect sensors into a signal which can be utilized by the microprocessor. Commonly, a voltage signal is generated by this circuit. The output of Hall effect pulser 114 is applied to an amplifier 116 with a voltage feedback feature. The output of the amplifier is the electrical feedback signal supplied to microprocessor 56.

FIG. 3 also shows that driver 74 includes a current summer. Driver 74 applies current to the motor to drive the motor. The summer is an internal circuit in the driver. The summer sums signals representative of the motor load drive currents. The output of the current summer is applied to a current to voltage converter 118. The output of the current to voltage converter is applied to amplifier 120. The output of amplifier 120 is the motor load current i signal. This signal, or a digital representation thereof, is applied to microprocessor 56.

In FIG. 2, signal conditioner 80 is embodied as the filter/amplifier/pulser/amplifier shown in FIG. 3 used in connection with one of the Hall effect sensors. Signal conditioner 78 includes converter 118 and amplifier 120.

Microprocessor 56 is also supplied with several mechanical feedback signals showing the position of the actuator and hence the position of the air damper and the valve. These are position indicative signals. This mechanical feedback signal is generated by a variable resistor 82. Motor shaft 84 is mechanically coupled to a gearbox 86. A mechanical output shaft 88 rotates in a defined ratio with respect to motor shaft 84. Shaft 84 is ultimately mechanically coupled to the air damper or valve. Additional couplers, linkages or gears may be utilized. Since variable resistor VR 82 is mechanically attached to shaft 88, the voltage output Vr on line 89 is indicative of the mechanical position of the actuator and hence the position of the air damper or the valve. The mechanical feedback signal Vr or a digital representation thereof is applied to microprocessor 56.

Microprocessor 56 also receives operator input based on the states of various switches 90. As explained later, the operator can change the state of various switches in order to select the appropriate control input, to calibrate the system, and to change the operation of microprocessor 56 and hence controller 45. Microprocessor 56 generates certain operator outputs in the form of signals which activate light emitting diodes LEDs 91.

As a further safety backup, actuator system 45 includes a reset circuit 92. In the event the 5 volt supply falls below a predetermined value (for example, 4.5 volts), the reset circuit 92 changes state and microprocessor 56 is notified of this power failure. Since capacitor bank 66 supplies supplemental backup voltage for not only the motor but also the associated electronics, if the 5 volt supply falls below 4.5 volts, microprocessor 56 automatically resets itself.

Microprocessor 56, as described above, includes a memory 94. Additional memory and programs or software routines are provided by the erasable programmable EEPROM memory 96. Memory 96 is a 4K byte memory. The A to D converter in microprocessor 56 is an 8 channel converter with an 8 bit resolution. The microprocessor includes a watchdog timer such that, if the microprocessor is stuck in a certain recycling loop, the microprocessor automatically resets itself. The microprocessor 56 includes 3 programmable counters. One of these counters is utilized to count the electronic feedback signal from the Hall sensors. Another one of these counters is utilized to generate the high frequency pulse width modulated signal PWM developed by microprocessor 56 and sent to driver 74 to drive motor 50. EEPROM memory 96 is a RISC based memory and is a one time programmable unit. As explained earlier, many of these discrete components may be embodied on a single ASIC or Application Specific Integrated Circuit chip. The claims appended hereto are meant to cover this and other embodiments.

The reason microprocessor 56 utilizes both an electrical feedback signal and a mechanical feedback signal is that the electrical feedback signal is more sensitive to the actual position of the motor, i.e., more precise, since the electrical feedback counts each revolution (in actuality, 3 pulses per revolution) of the motor shaft. However, the mechanical feedback signal always represents the position of the air damper or valve and is not adversely affected by loss of power or alteration of the mechanical position by the operator. The following Feedback Sensitivity Table for the mechanical feedback signal Vr as well as the count from the Hall sensors (herein CNT) provides some indication of the degree of sensitivity.

| Feedback Sensitivity Table | | |
| --- | --- | --- |
| | Range | Steps |
| Vr | 1–10 | 255 |
| Count | 1–100 | 655 |

The microprocessor 56 develops a pulse width modulated PWM low frequency If signal which is applied to signal conditioner 99. The following Feedback PWN-1f Signal Conditioner Table lists some of the standard components for the signal conditioner 99.

| Feedback PWM-lf Signal Conditioner |
| --- |
| D.C. converter |
| Buffer |
| Voltage to current converter |
| Output: 4–20 ma industry standard |

FIG. 4 diagrammatically illustrates actuator 202. The actuator includes control electronics 204, a fractional horsepower motor 206, a mechanical linkage 208 and an actuator coupler 210. Actuator coupler 210 is attached to shaft 212 which ultimately is mechanically coupled to the air damper or valve. Shaft 212 as well as actuator coupler 210 rotate as shown by double-headed arrow 214. In addition, variable resistor VR 82 is attached in some manner to the mechanical linkage 208 from motor 206. This is not shown in FIG. 4. The mechanical feedback signal Vr provides an indication of where actuator coupler 210 is in relationship to its entire stroke. The stroke of the actuator coupler 210 shown in FIG. 4 lies between end stop 216 and end stop 218. As shown, actuator coupler 210 is in an intermediate position end stop 216 and end stop 218.

It is common in the industry for the operator to select a failsafe position for the air damper or valve that is at one of the end stops 216, 218. As described later, this failsafe end stop position is programmable in microprocessor 56 and memory 94 and memory 96.

A problem arose in prior art devices in that when the actuator, and particularly the actuator coupling, was driven in a failsafe mode and the actuator coupling was within 5% of its total stroke near the failsafe end stop position, the capacitive energy source would drive the motor and the actuator so quickly to the end stop that the end stop and/or the actuator coupler would break. Sometimes, the mechanical connection to the actuator coupler would be stripped.

In contrast, the present invention achieves a soft landing of the actuator near the failsafe end stop position.

Figure 5:
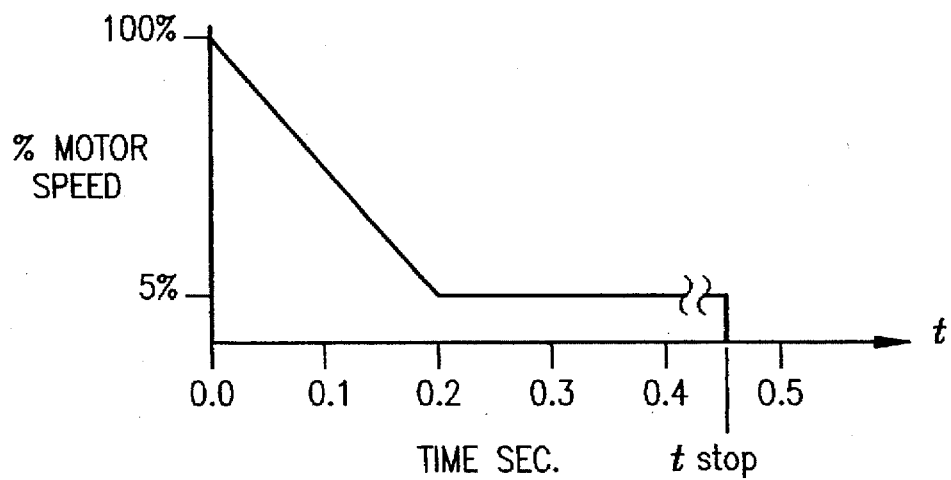
FIG. 5 illustrates one embodiment of the soft landing system in graphic form showing the percent of motor speed versus the time.

FIG. 5 graphically illustrates the soft landing feature. In the failsafe mode, the capacitive energy source supplies full and complete drive power to the fractional horsepower motor. Also in the failsafe mode, the microprocessor generates a drive control signal that commands the motor to move as quickly as possible to the failsafe position. Since this failsafe (FS) position is normally near an end stop, the fractional horsepower motor and actuator coupler are driven quickly to the FS end stop. Within a predetermined position band near the end stop (herein 5%), the microprocessor quickly reduces the speed of the motor by commanding the driver to supply less power to the motor. The soft landing band is programmable.

FIG. 5 graphically shows that the speed of the motor is changed from 100% to 5% within a timeframe of 0.2 seconds. Thereafter, the motor is supplied 5% of its drive power until it reaches the failsafe end stop position. At time t stop, the actuator has placed the air damper or valve in the failsafe position. The predetermined band in this example is set at 5% of the total stroke. Accordingly, when the mechanical feedback signal and/or the electronic feedback signal indicates that the motor is within 5% of the failsafe position, the microprocessor activates the soft landing routine, reduces the motor speed from 100% to 5% in 0.2 or 0.3 seconds (which is programmable), such that the air damper or valve is not mechanically shocked or the mechanical couplings are not broken during a failsafe operation.

Upon occasion, the actuator may be moved such that the mechanical position of the air damper or valve and hence the actuator coupler does not correspond to the electronic feedback count signal. The electrical feedback signal or count is a measure of the number of pulses from the Hall sensor, an electromagnetic feedback device. In such a case, the microprocessor selects the mechanical feedback signal Vr as being the principal feedback signal.

Figure 6:
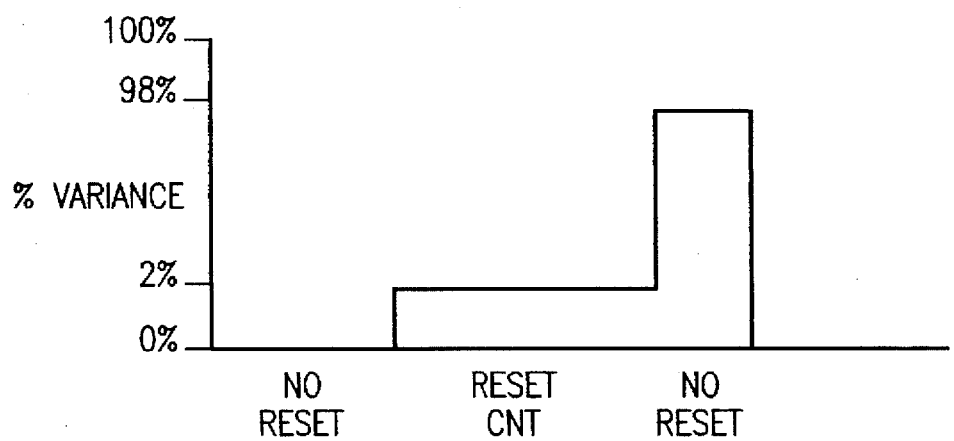
FIG. 6 illustrates, for one embodiment, the reset feature to adjust the electronic feedback signal with the mechanical feedback signal which the controller system utilizes to identify the position of the actuator and hence the air damper or valve.

In FIG. 6, the reset for the feedback signals is graphically illustrated. The microprocessor continually monitors the ratio between the electronic feedback signal from the Hall sensors or other electromagnetic sensors attached to the motor and the mechanical feedback signal from the variable resistor Vr. Of course, other types of mechanical feedback systems could be utilized which identify the actual mechanical position of the actuator coupler. See coupler 210 in FIG. 4. In any event, the microprocessor continually monitors the ratio between the electronic count and the mechanical feedback Vr. If this ratio, which in the present embodiment is a difference signal, is less than 2%, no adjustments are made to the electronic count. If the variance is greater than 2%, the electronic counter is reset based upon a predetermined formula established during the calibration routine. In other words, the mechanical feedback signal Vr is the principal feedback signal and the electronic feedback signal, a subservient feedback signal, is reset to the mechanical feedback signal. This is particularly true when the operator sometimes changes the position of the air damper or valve independent of the fractional horsepower motor. The valve or air damper could be mechanically moved. Since this mechanical movement is translated to the actuator coupler, the mechanical feedback device and signal Vr more absolutely locates the air damper or valve than the electronic feedback signal. On the other hand, if the variance is 2% near 100–99%, the electronic signal is not reset. Other reset routines could be utilized.

Figure 7A:
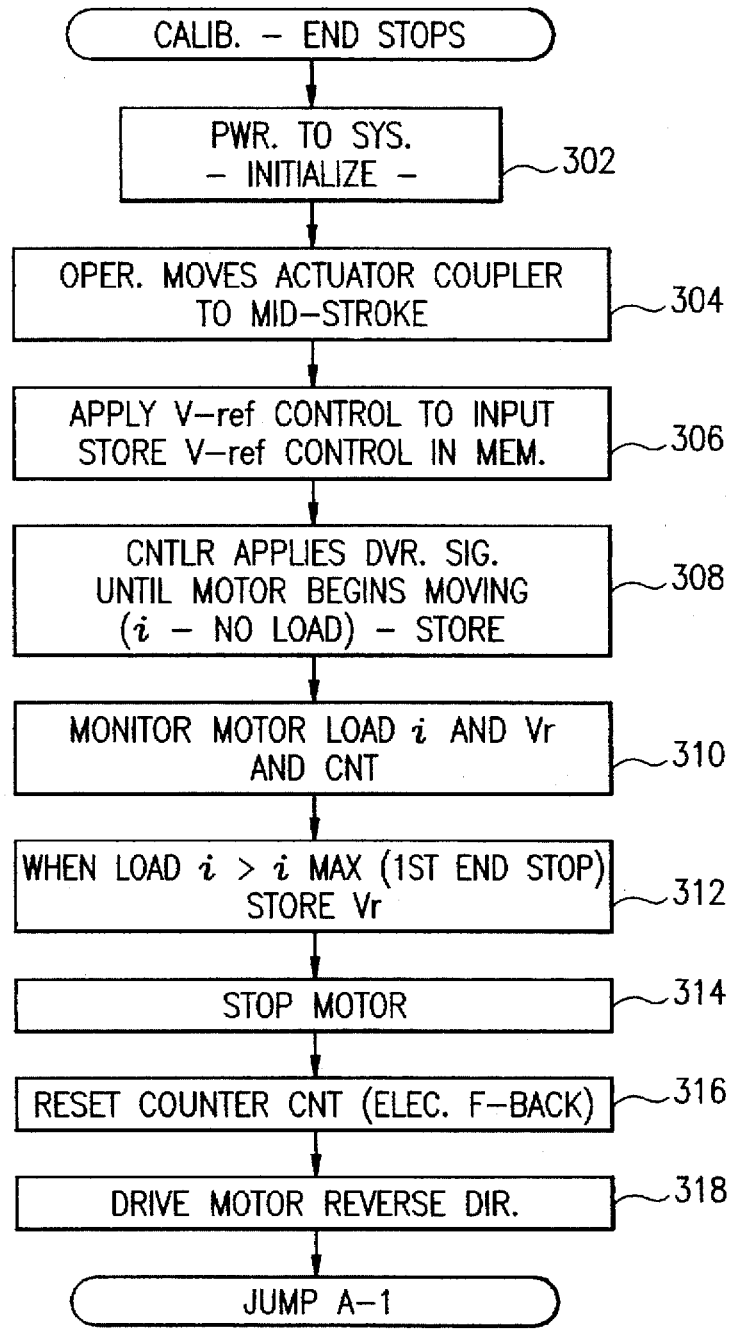
FIGS. 7A and 7B provide general flow charts showing a calibration-end stop routine executed by the controller in accordance with the principles of the present invention.
Figure 7B:
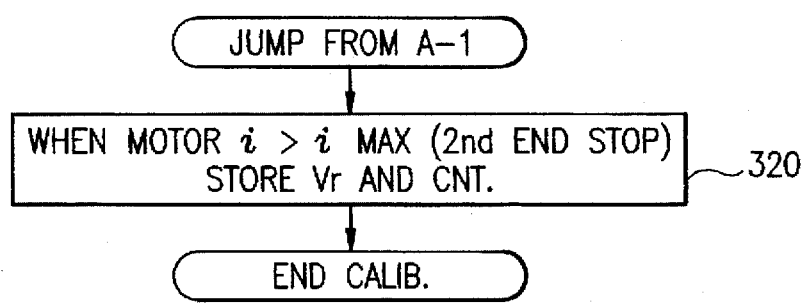

FIGS. 7A and 7B illustrate flow charts showing the major steps involved in calibrating the microprocessor-based controller. This calibration routine assumes that there are mechanical end stops on the actuator or mechanical stops on the attached equipment. See FIG. 4, end stops 216, 218. This calibration-end stop routine is also utilized to calibrate the controller at the factory, that is, prior to installation in an HVAC system.

In step 302, power is applied to the system. Typically, the valve actuator is placed in the middle of the stroke, intermediate end stops 216, 218. See step 304. The power signal is applied to the input terminal in step 306 and this signal is utilized as a reference signal. This power reference signal is stored in memory. Of course, the actual power signal is not stored but only a digital representation of that signal is stored.

In the present embodiment, several values are stored in the memory. The following Stored Value Table provides some indication of signals that are discussed hereinafter.

| Stored Value Table | |
|---|---|
| Value 1 | voltage represents current i when full load on motor |
| Value 2 | Vr at first end stop |
| Value 3 | count over full stroke |
| Value 4 | Vr at second end stop |
| Value 5 | voltage represents minimum current i to drive motor |

The microprocessor then develops a drive signal to the motor driver circuit. See step 308. When the motor shaft begins to rotate, as noted by the change in the electronic feedback signal or count and the mechanical feedback signal Vr, the microprocessor stores that initial motor current i as a motor current i no load signal in its memory.

In step 310, the microprocessor continues to monitor the motor lo ad current i and the position indicative signal. This position indicative signal is the mechanical feedback signal Vr and the electronic feedback signal count (cnt). When the motor current i exceeds a load threshold i max, the actuator has reached one end stop. For example, end stop 218 in FIG. 4. The value of the mechanical feedback signal Vr is stored. See step 312.

In step 314, the motor is stopped. In step 316, the microprocessor resets the counter which counts the pulses from the electromagnetic sensor. This is the electronic feedback signal. In step 318, the motor is driven in a reverse direction. The program moves from jump point A-1 to jump point A-1 in FIG. 7B. In step 320, when the motor load current i exceeds the maximum current i max, this indicates that the valve actuator is near the second end stop. In that step, the microprocessor stores the value of the mechanical feedback signal Vr and the electronic feedback signal count. Further, the microprocessor then computes the ratio between the mechanical feedback signals and the electronic feedback signals. Accordingly, the microprocessor then has stored the motor current load i, the mechanical feedback position indicative signal Vr at the first end stop, the electronic count over the entire stroke from the electronic feedback signal, the mechanical feedback signal and position indicator Vr at the second end stop, and the minimum current i necessary to drive the motor initially.

Figure 8:
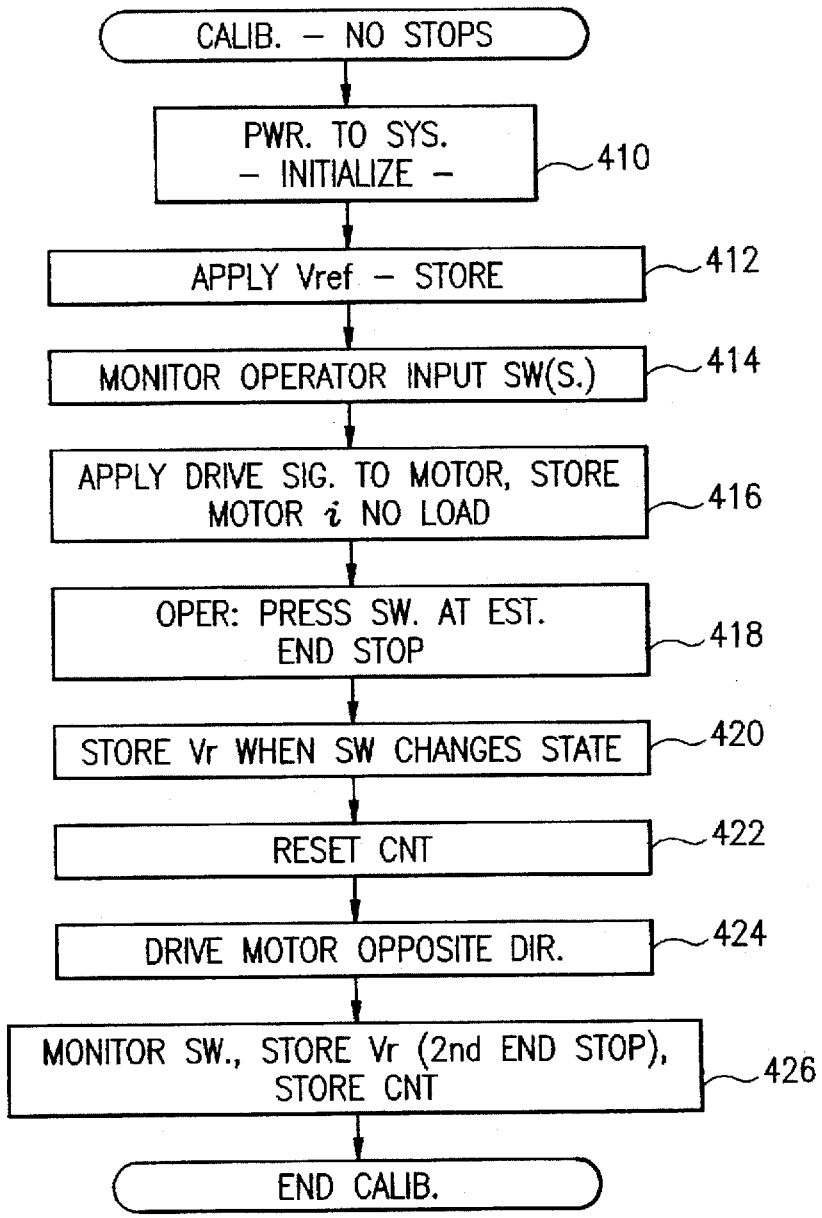
FIG. 8 illustrates a flow chart showing the major steps in a calibration-no stops routine.

FIG. 8 illustrates a flow chart for the calibration-no stops routine.

In step 410, a power is applied to the system and the system is initialized. This power reference signal is again noted as described above in connection with step 306. The voltage reference power signal is stored in step 412. In step 414, the system continually monitors one of the operator controlled switches. As shown in FIG. 2, switch bank 90 includes a number of switches or a single switch. In step 416, the microprocessor applies a drive signal to the driver and the fractional horsepower motor moves. The microprocessor stores the current necessary to move the motor initially. This is the motor current i no load. In step 418, the operator depresses the switch or changes its state when the operator believes the actuator is at an end stop. In step 410, the mechanical feedback signal Vr is stored. In step 422, the counter storing the output of the electronic feedback signals is reset. In step 414, the microprocessor drives the actuator motor in a different direction. In step 426, the system monitors the operator controlled switch, stores the mechanical feedback signal Vr representing the second end stop, and then stores the count value from the electronic feedback signal.

Figure 9:
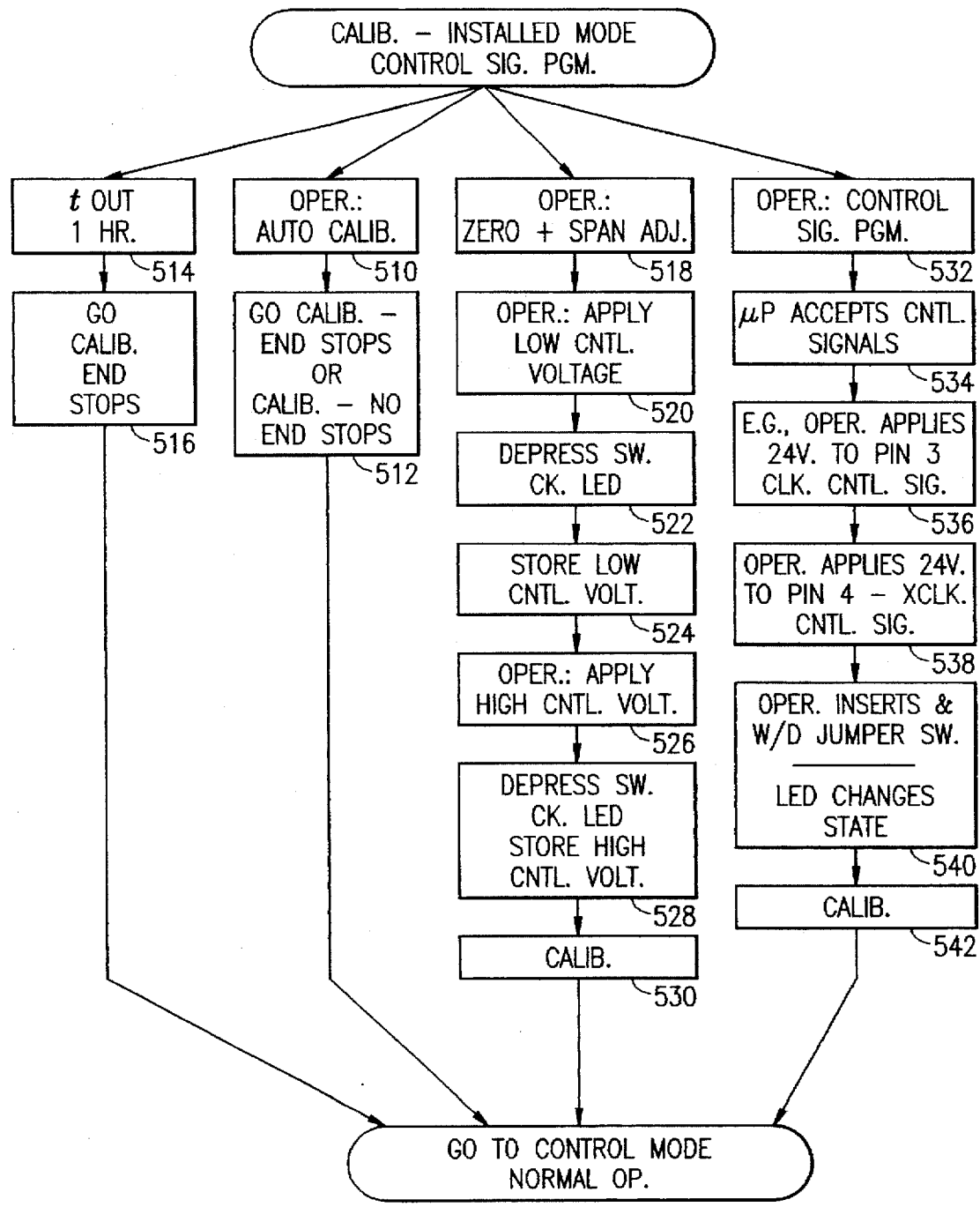
FIG. 9 illustrates a flow chart showing the major steps in a calibration-installed mode and control signal program.

FIG. 9 diagrammatically illustrates the flow chart for the calibration system when the actuator controller is installed in an HVAC system. Also, the flow chart in FIG. 9 shows how the system is programmed to accept various control input signals.

The following Calibration Mode Table shows how the present embodiment of the system is programmed by the operator.

| Calibration Mode Table | |
|---|---|
| Mode | Operator Control |
| Auto Calibration | depress switch 10 sec. after power ON |
| Zero and Span Adjust | depress and hold switch within 10 sec. until light ON |
| Control Signal | depress and release switch within 10 sec. - light flashes |
| Auto Back-Up Calibration | After long time (e.g., 1 hr.) after power ON |

For example, if the operator desires an automatic calibration of the system, he or she depresses this switch 90 (FIG. 2) ten seconds or later after the power has been applied ON to the controller. This initiates the auto calibration programs discussed above in conjunction with FIGS. 7A, 7B and 8. The no-end stop program involves further operator input.

In FIG. 9, the auto calibration step is shown as steps 510 and 512. Since the operator can select the end stop calibration or no end stop calibration, it is apparent that this option is available based upon his or her depression of the switches during the calibrating sequence.

If the operator does not depress the switch after ten seconds after power is applied ON to the power input terminal, the system starts a counter. In step 514, after one hour (which timeout is programmable), the system automatically goes into a calibration routine. Step 516 automatically calibrates the actuator using the end stop program. Automatic calibration cannot be achieved at this point with the calibration-no end stop routine. It should be noted that once the actuator coupler is mechanically attached to an air damper or a valve, and the failsafe position is set by the operator (by changing a jump switch or setting a switch on the board [not shown]), the system could utilize the actual mechanical stops of the damper or valve to fully close the air damper vents or fully open the air damper vents rather than utilize the end stops on the valve actuator coupler as shown in FIG. 4.

Another option to calibrate the system in an installed mode is the zero and span adjustment operation 518. To activate this programmable sequence, the operator must depress the switch and hold the switch within the ten second initial time frame after power is applied ON to the power input terminal until the LED or light goes ON. In FIG. 9, step 520 indicates that the operator has applied a low control voltage and in step 522, the operator has depressed the switch and is checking the LED or light. Of course, the switch could be released rather than depressed. It is simply necessary to change the state of the switch. In step 524, the system stores the low control voltage in its memory. In step 526, the operator applies the high control voltage to the system. In step 528, the operator depresses the switch, checks the LED operator feedback light and the system stores the high control voltage into its memory. In step 530, the system executes one of the calibration routines discussed above. Examples of the various control signals are set forth above in the Power—Control Signal Table and the Input Control Signal Table.

Another choice for the calibration-installed mode routine is to have the operator select the control signal program step 532. In order to enter this portion of the control signal program, the operator depresses and releases the switch 90 within the ten second time frame and the LED light flashes. In step 534, the microprocessor acknowledges that it will accept control signals. In step 536, as an example of this control signal program routine, the operator applies 24 volts to pin 3 and this represents the clockwise control signal. In step 538, the operator applies 24 volts to pin 4 which represents the counterclockwise control signal. In other words, when 24 volts is applied to pin 3 of input/output port 48, the microprocessor will command the motor to go counterclockwise. When 24 volts is applied to pin 4 of I/O port 48, the microprocessor will command the motor to be driven clockwise. In step 540, the operator inserts and then withdraws a jumper. This results in a change of state which is effectively a switch to the microprocessor. The LED changes state and the operator then knows that he or she has programmed the controller. In step 542, a calibration routine is executed, either the end stop calibration or the no end stop calibration routine.

FIG. 10 A and 10B illustrate flow charts for the control mode in normal operation. In step 610, the operator applies the center position control signal to the input/output port 48. In step 612, the driver moves the motor to the center position by monitoring the mechanical feedback signal Vr and the counter. The counter is more sensitive to the actual position, however, the mechanical feedback signal Vr is, in the preferred embodiment, the principal feedback signal. In other embodiments, the mechanical feedback signal may be the principal signal and the electronic feedback signal subservient. In step 614, the software provides a low pass filter for input control signals. The following Low Pass Software Filter Table provides some indication of the type of low pass filter which may be programmed into the microprocessor.

| Exemplary Low Pass Software Filter Table Filter for Input Control - Drive Signal |
|---|
| Variation in drive signal (programmable) |
| 2.0.v. ..... 2.2.v ..... 2.0.v. ..... |
| Time (programmable) |
| 0.0 sec. ...... ............ 0.1 sec. ... |
| Filter output (digitally represented) |
| 2.0.v. ..... ............................... |

The low pass filter can be programmed such that the microprocessor will only generate a single position control signal if the control input signal varies within a predetermined range and varies within a predetermined time frame. In a low pass filter, signal changes higher than a frequency or time threshold are ignored. In the example shown in the table above, the control input signal applied to input/output port 48 varies between 2.0 volts and 2.2 volts over a time frame of 0.1 seconds. The low pass filter blocks this control input signal and generates a representative signal for 2.0 drive volts throughout that time frame. In other words, the control input signal has varied at a high frequency, higher than the frequency window set in the programmable low pass filter.

Of course, the software filter in the microprocessor can be changed such that control input signals having greater amplitude variances (more than the 0.2 volt amplitude threshold) or different frequencies (lower than 0.1 seconds) would affect the filter output.

In step 618, the system continually monitors the difference between the mechanical feedback signal Vr and the electronic feedback count. In step 620, the count is incremented or decremented based upon the direction of the actuator motor. In other words, the count cannot determine whether the motor is moving clockwise or counterclockwise. Accordingly, the microprocessor must increment the count if the motor moves in a clockwise direction and decrement the count if the motor moves in a counterclockwise direction. The opposite may be true in a system which is configured differently.

In step 622, the mechanical feedback signal Vr is designated the prime or principal feedback signal. In step 624, a determination is made whether the difference between the mechanical feedback signal Vr and the count or the electrical feedback signal is greater than or less than 2% the mechanical feedback signal. If so, the count or electrical feedback signal is modified or corrected to conform to the mechanical feedback signal. A similar correction is made at the Vr-end stops. If there is less than 2% of a difference between the count and the Vr-end stop, no correction is made to the count. If it is greater than 2%, then the system activates the step correction. The step correction was earlier discussed in connection with FIG. 6. Other step corrections could be utilized.

Figure 10A:
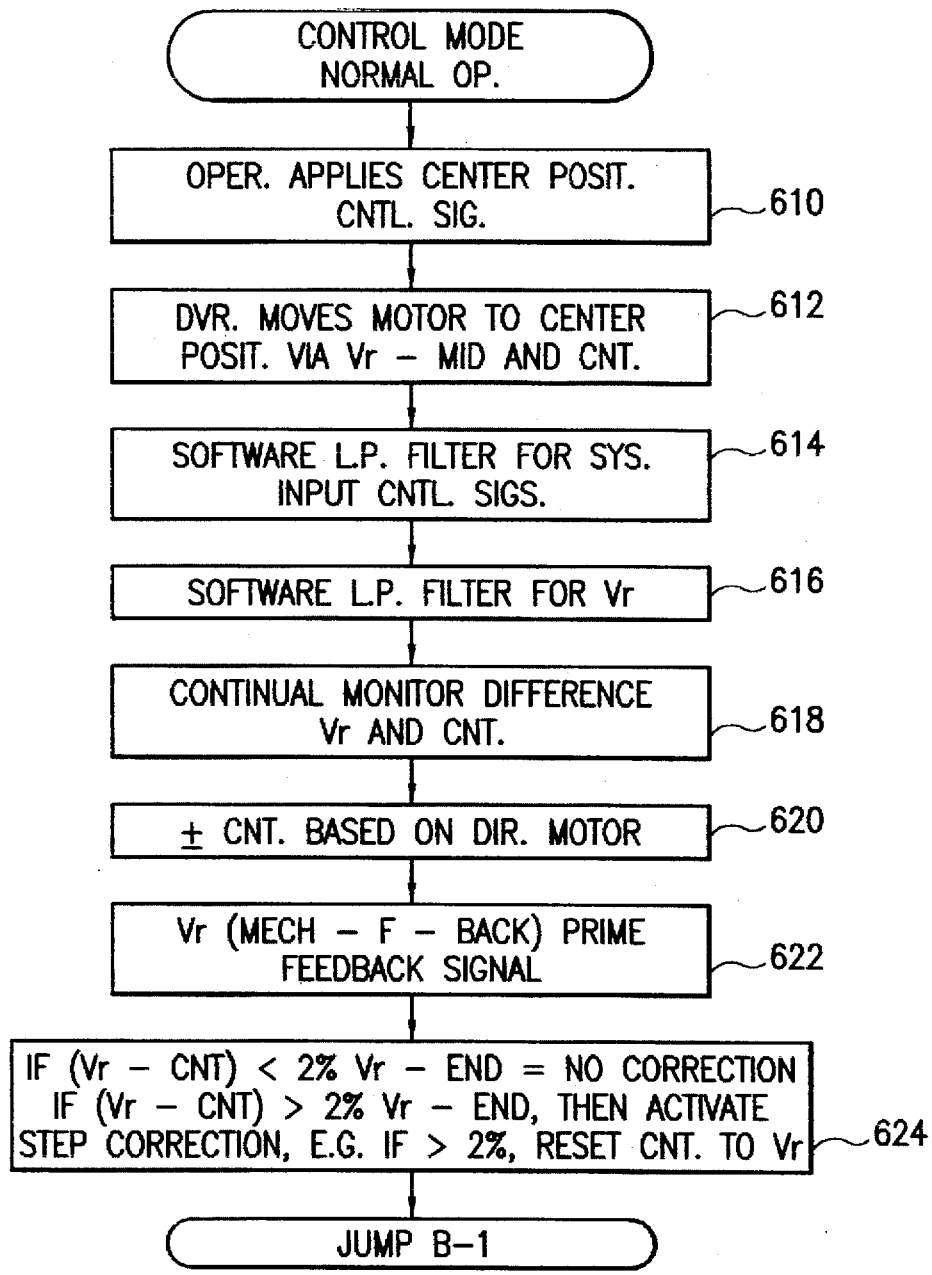
FIGS. 10A and 10B illustrate flow charts showing the major steps in a control mode-normal operation program.
Figure 10B:
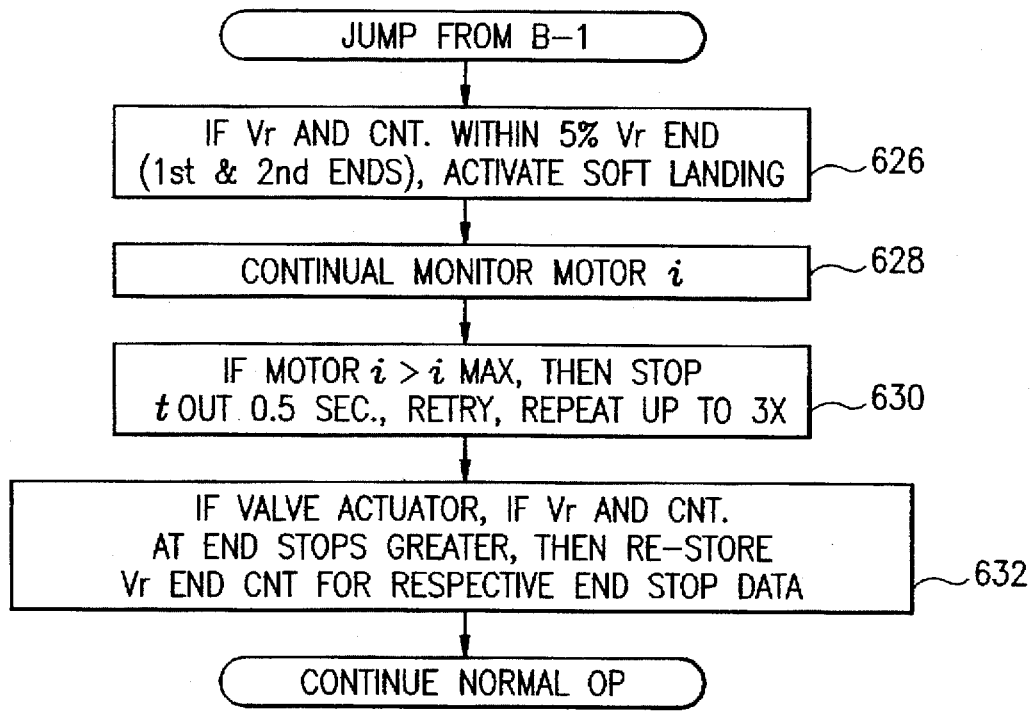

The system jumps from jump point B-1 in FIG. 10A to jump point B-1 in FIG. 10B.

In step 626, a determination is made if the feedback signals Vr and count are within 5% of the Vr-end position. The Vr-end position could be the first end stop or the second end stop. If the feedback signals indicate that the mechanical system is within 5% of the end position, the system activates the soft landing feature. Five percent of the entire actuator stroke is designated as the predetermined position band near the failsafe FS position. Other bands may be selected. The soft landing feature is discussed above in connection with FIG. 5. Of course, the motor speed or power ramp or slope shown in FIG. 5 could be changed. Rather than having a sloped ramp, a stepped ramp could be utilized, and the time constant could also be changed. The lower drive level (5%) could also be changed. Particularly, a different soft landing deceleration curve could be utilized during normal operations as compared with a quick soft landing deceleration curve discussed above in connection with the failsafe operation.

In step 628, the system continually monitors the motor load current i. In step 630, if the motor load current i exceeds a maximum value i-max, then the motor is stopped. If the mechanical system is mid-stroke between end stops and excessive current is detected, the system provides a timeout of 0.5 seconds and retries the motor by applying a current or an appropriate drive signal. This monitoring of motor load current i and determining whether the i-max threshold is exceeded occurs up to three times. This routine enables the actuator to "unstick" a damper or valve. If the actuator is not fully operational after the three attempts, the actuator is shut down. Other cycle periods may be selected.

In step 632, the microprocessor conducts a special routine if the actuator is utilized as a valve actuator. In a valve actuator, and particularly a plug valve, the end stops change over time due to wear on the valve seat. If the valve actuator end stops change, some mechanism or system must be incorporated to change the electronic end stop position values. In step 632, if the mechanical feedback signal Vr and the electronic feedback signal count at the end stop is greater than the earlier stored values, the mechanical feedback signal Vr is stored as a new end stop position signal and the count is also stored as a new end stop signal.

The Safety Parameter Table set forth below provides additional safety parameters for this controller.

| Safety Parameter Table |
|---|
| Electrical Feedback |
| Monitor counter<br>Does count exceed max. count? |
| Mechanical Feedback |
| Monitor variable resistor Vr<br>Does Vr exceed max. Vr? |

The microprocessor continually monitors the electronic feedback as a count and determines whether the count exceeds a maximum count and a minimum count. These count values are based upon end stop counts. This maximum count could be a certain percentage above and below the full stroke count which is stored as one of the critical values. See the Stored Value Table set forth above. Further, the mechanical feedback signal can be used to determine when the mechanical feedback signal Vr exceeds a maximum Vr. The maximum Vr could also be a certain percentage above and below Vr end stop as initially established earlier during the calibration routine.

The microprocessor also includes a software filter for the feedback signal. The following Software Filter Table provides an example of such a software filter.

| Software Filter for Vr Table |
|---|
| 1. Store 256 readings<br>2. Average |

| Software Filter for Vr Table |
|---|
| 3. Store Vr value<br>4. Obtain and store next 256 readings<br>5. Repeat and update Vr value |

In the present embodiment, the electronic feedback from the Hall effect sensors generate a large number of signals. The mechanical feedback sensor system Vr stores 256 readings. The table shows the software filter for Vr. The 256 readings for Vr are averaged. They are stored as the running Vr value. Thereafter, the system obtains the next 256 readings. The first 256 readings are discarded. Thereafter, the new 256 readings are averaged and the new value Vr is stored. A similar software filter could be utilized for the Hall effect pulses and counter.

Figure 11:
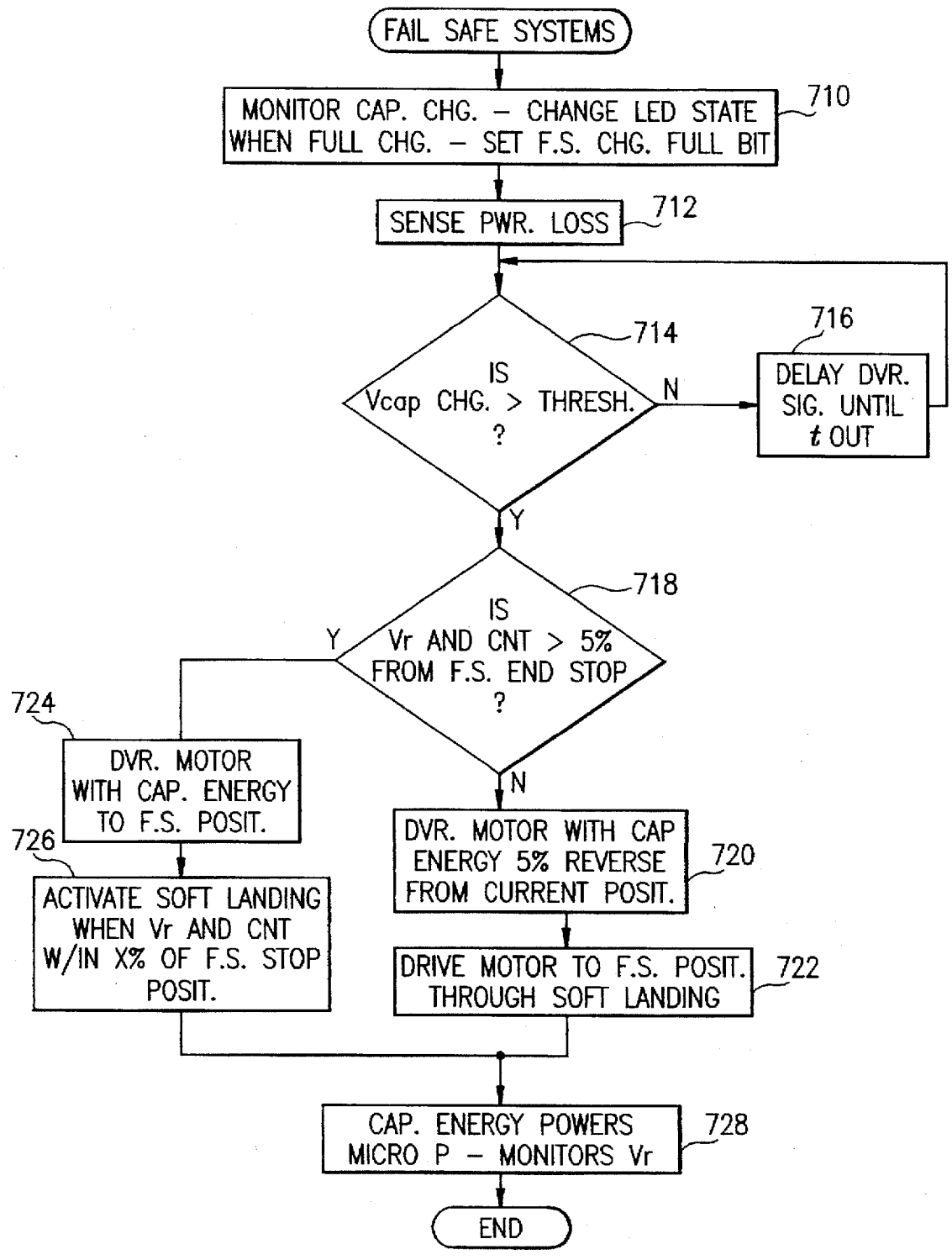
FIG. 11 illustrates a flow chart showing the major steps in a failsafe system operation.

FIG. 11 diagrammatically illustrates a flow chart for the failsafe (FS) system routine. In step 710, the system monitors the charge on the capacitor storage unit. When the charge exceeds a charge threshold, an LED or operator feedback light is illuminated. When fully charged, the microprocessor sets a failsafe charge full bit. In the absence of the failsafe charge full bit being set, in one embodiment, the microprocessor will not activate the failsafe routines. In step 712, the system senses a power loss or a loss of power to input/output port 48. Decision step 714 determines whether the voltage on the capacitive energy source exceeds the threshold. If not, step 716 delays the output to the driver and hence the actuator motor until a timeout counter clocks out. In one embodiment, this timeout is approximately 1–5 seconds. After the delay signal, the system returns to decision step 714.

If the YES branch is taken from decision step 714, the program enters decision step 718. In step 718, a determination is made whether the mechanical feedback signal Vr and the electronic feedback count is greater than 5% from the failsafe end stop. If not, the system executes step 720 which provides for driving the motor in a reverse direction with capacitor energy and moving the mechanical system 5% of the total stroke by monitoring Vr from the current position. This backing off of the actuator from the failsafe end stop enables the system to firmly seat at the failsafe position and to avoid damage to the mechanical linkage in the system. In step 722, the system drives the motor to the failsafe position through the soft landing routine discussed above.

Returning to decision step 718, if the feedback signals Vr and count show that the current position of the air damper and valve is more than 5% away from the failsafe end stop, the YES branch is taken. Thereafter, the system executes step 724 and the driver activates and drives the motor with the capacitor energy to the failsafe position. This drive occurs at the fastest possible speed. The full energy of the capacitor is available to the motor. In step 726, the system activates the soft landing routine when the feedback signals Vr and count fall within a certain percentage X % of the failsafe stop position. In the present embodiment, the soft landing occurs within 5% of the FS end stroke. In step 728, the capacitor continues to supply energy to the microprocessor and monitors the mechanical position. After a predetermined time period (programmable), the microprocessor disconnects the capacitive energy source from the driver motor and continues to accept power from the capacitors for the rest of the circuit. In this sense, FIG. 2 may be modified such that the microprocessor has a control line to switch 60.

Switch 60 in the current embodiment is a relay and the sensor 62 is a coil. However, a solid state switch could be utilized and other types of sensors could be utilized.

The order of steps or routines discussed above may be modified. For example, in FIGS. 10A and 10B, the monitoring of current i, step 630, could precede low pass filter step 614.

The claims appended hereto are meant to cover modifications and changes within the spirit and scope of the present invention.

What is claimed is:

1. A microprocessor-based controller for a fractional horsepower motor used as an actuator and adapted to be coupled to an air damper or a valve, said controller receiving power and control input signals and comprising:

a microprocessor coupled to and operating in conjunction with a memory;

a power and control input signal converter for regulating said power and converting said control input signals;

a capacitive energy storage unit coupled to said converter and receiving power therefrom, said capacitive energy storage unit storing sufficient power to drive said fractional horsepower motor and move said coupled air damper or valve to a predetermined fail safe position upon a loss of said power;

means for sensing a presence and said loss of said power and generating a fail safe control signal upon said loss of said power;

a switch receiving said fail safe control signal and passing power from one of said converter and said capacitive energy storage unit based upon the absence or presence of said fail safe control signal, respectively;

a driver controlled by and coupled to said microprocessor, said driver receiving said power from said switch and driving said fractional horsepower motor based thereon;

means, coupled to said microprocessor, for continually monitoring a position of said coupled air damper or said valve and for generating a position indicative signal;

said microprocessor having means for driving said air damper or valve via said driver to said fail safe position in the presence of said fail safe control signal and including means for reducing said power applied to said fractional horsepower motor via said driver when said position indicative signal falls within a predetermined position band near said predetermined fail safe position and in the presence of said fail safe control signal; and, said microprocessor having means for generating position control signals based upon said control input signals from said converter, said microprocessor applying said position control signals to said driver and thereby affecting said position of said coupled air damper or valve.

2. A controller as claimed in claim 1 wherein said capacitive energy storage unit has a capacitive rating exceeding 0.045 farads and a volumetric size not exceeding 30 cubic inches.

3. A controller as claimed in claim 2 wherein said capacitive energy storage unit includes one of a single capacitor and a plurality of electrically linked capacitors.

4. A controller as claimed in claim 1 wherein said means for reducing said power reduces said power over a predetermined time period, said predetermined time period being stored in said memory.

5. A controller as claimed in claim 1 wherein said means for reducing said power reduces said power when said switch passes power to said driver and in the presence of said fail safe control signal.

6. A controller as claimed in claim 1 wherein said means for monitoring includes an electro-mechanical sensor which mechanically senses said position of said damper or valve and generates a plurality of electrical signals representative of said position indicative signal.

7. A controller as claimed in claim 6 wherein said electromechanical sensor is a variable resistor mechanically coupled to said damper or valve.

8. A controller as claimed in claim 1 wherein said means for monitoring includes an electromagnetic sensor which senses an angular displacement of said fractional horsepower motor and generates a plurality of electrical signals representative of said position indicative signal.

9. A controller as claimed in claim 8 wherein said electromagnetic sensor is one of a Hall effect sensor and a back electromagnetic force EMF coil sensor.

10. A controller as claimed in claim 1 wherein said means for monitoring includes an electro-mechanical sensor which mechanically senses said position of said damper or valve and generates a plurality of electrical signals representative of a first position indicative signal and includes an electromagnetic sensor which senses an angular displacement of said fractional horsepower motor and generates a plurality of electrical signals representative of a second position indicative signal, said microprocessor having means for processing said first and second position indicative signals and integrating said first and second position indicative signals into said position control signals applied to said driver and said means for reducing said power in the presence of said fail safe control signal.

11. A controller as claimed in claim 10 wherein said microprocessor includes means for selecting said first position indicative signal from said electromechanical sensor as an accurate position signal in contrast to said second position indicative signal from said electromagnetic sensor.

12. A controller as claimed in claim 11 wherein said microprocessor includes means for resetting said second position indicative signal with said first position indicative signal when a difference between said first and second position indicative signals exceeds a predetermined threshold.

13. A controller as claim 12 wherein said microprocessor includes means for generating a reverse position control signal when said first position indicative signal falls within said predetermined position band near said predetermined fail safe position and in the presence of said fail safe control signal prior to activating said means for reducing said power.

14. A controller as claimed in claim 13 including means for determining power consumption by said fractional horsepower motor and generating a motor load signal, said microprocessor including means for determining when said motor load signal exceeds a predetermined load threshold.

15. A controller as claimed in claim 14 wherein said microprocessor includes means for calibrating said controller, said means for calibrating correlating said first and second position indicative signals with said motor load signal such that when said motor load signal exceeds said load threshold, said means for calibrating stores said first and second position indicative signals in said memory as a first end stop position signal, said means for calibrating including means for developing reverse position control signals for said driver to effectuate a reversal of said air damper and valve and storing said first and second position indicative signals in said memory as a second end stop position signal when said motor load signal exceeds said threshold after application of said reverse position control signal.

16. A controller as claimed in claim 15 wherein said means for reducing said power in said microprocessor utilizes said first and second end stop position signals to drive said fractional horsepower motor to effectuate a soft landing of said actuator at end stop positions of said air damper and valve.

17. A controller as claimed in claim 16 wherein said microprocessor includes means for stopping said motor via said driver when one of said first and second position indicative signals exceeds a respective first and second end stop position signal by a predetermined amount.

18. A controller as claimed in claim 17 wherein said microprocessor includes means for applying a full power position control signal to said driver in the presence of said fail safe control signal thereby driving said motor to said fail safe position as quickly as possible and subject to said means for reducing said power near said fail safe position.

19. A controller as claimed in claim 18 wherein said means for sensing is a first means for sensing and said controller including second means for sensing coupled to said capacitive energy storage unit, said second means for sensing monitoring a charge on said capacitive energy storage unit and generating a charge signal, said microprocessor including means for determining whether said charge signal exceed a predetermined charge threshold, said microprocessor further including means for delaying said fail safe control signal from said first means for sensing unless said charge signal exceeds said predetermined charge threshold.

20. A controller as claimed in claim 19 wherein said microprocessor includes a software low pass filter with passes position control signals less than a predetermined frequency.

21. A controller as claimed in claim 20 wherein said software low pass filter is a control low pass filter and said microprocessor includes a position software low pass filter which filters said position indicative signal such that said controller utilizes a filtered position indicative signal less than a predetermined position frequency.

22. A controller as claimed in claim 1 wherein said microprocessor includes means for accepting power and control input signals configured as one of an alternating current power control signal, a phase modulated voltage power control signal, a two position power and control signal and tri-state power and control signal.

23. A controller as claimed in claim 1 wherein said means for reducing said power operates to reduce said power to said fractional horse said motor a all times when said position indicative signal falls within a predetermined position band near said predetermined fail safe position.

24. A controller as claimed in claim 1 wherein said microprocessor includes means for generating a reverse position control signal when said position indicative signal falls within said predetermined position band near said predetermined fail safe position and in the presence of said fail safe control signal prior to activating said means for reducing said power.

25. A controller as claimed in claim 1 wherein said microprocessor includes means for applying a full power position control signal to said driver in the presence of said fail safe control signal thereby driving said motor to said fail safe position as quickly as possible and subject to said means for reducing said power near said fail safe position.

26. A controller as claimed in claim 1 wherein said means for sensing is a first means for sensing and said controller including second means for sensing coupled to said capacitive energy storage unit, said second means for sensing monitoring a charge on said capacitive energy storage unit and generating a charge signal, said microprocessor including means for determining whether said charge signal exceed a predetermined charge threshold, said microprocessor further including means for delaying said fail safe control signal from said first means for sensing unless said charge signal exceeds said predetermined charge threshold.

27. A controller as claimed in claim 1 wherein said microprocessor includes a software low pass filter which passes position control signals less than a predetermined frequency.

28. A controller as claimed in claim 1 wherein said microprocessor includes a software low pass filter which filters said position indicative signal such that said controller utilizes a filtered position indicative signal less than a predetermined frequency.

29. A controller as claimed in claim 1 including means for determining power consumption by said fractional horsepower motor and generating a motor load signal, said microprocessor including means for determining when said motor load signal exceeds a predetermined load threshold.

30. A controller as claimed in claim 29 wherein said microprocessor includes means for calibrating said controller, said means for calibrating correlating said position indicative signal with said motor load signal such that when said motor load signal exceeds said load threshold, said means for calibrating stores said position indicative signal in said memory as a first end stop position signal, said means for calibrating including means for developing reverse position control signals for said driver and storing said position indicative signal in said memory as a second end stop position signal when said motor load signal exceeds said threshold after application of said reverse position control signal.

31. A controller as claimed in claim 30 wherein said means for reducing said power in said microprocessor utilizes said first and second end stop position signals to drive said fractional horsepower motor to effectuate a soft landing of said actuator at end stop positions of said air damper and valve.

32. A controller as claimed in claim 30 wherein said microprocessor includes means for stopping said motor via said drive when said position indicative signal exceeds a respective first and second end stop position signal by a predetermined amount.

33. A microprocessor-based controller for a fractional horsepower motor used as an actuator and adapted to be coupled to an air damper or a valve, said controller receiving power and control input signals and comprising:

a microprocessor coupled to and operating in conjunction with a memory;

a power and control input signal converter for regulating said power and converting said control input signals;

a capacitive energy storage unit coupled to said converter and receiving power therefrom, said capacitive energy storage unit storing sufficient power to drive said fractional horsepower motor and move said coupled air damper or valve to a predetermined fail safe position upon a loss of said power;

means for sensing a presence and said loss of said power and generating a fail safe control signal upon said loss of said power;

a switch receiving said fail safe control signal and passing power from one of said converter and said capacitive energy storage unit based upon the absence or presence of said fail safe control signal, respectively;

a driver controlled by and coupled to said microprocessor, said driver receiving said power from said switch and driving said fractional horsepower motor based thereon;

means, coupled to said microprocessor, for continually monitoring a position of said coupled air damper or said valve and for generating a position indicative signal;

said microprocessor having means for generating position control signals based upon said control input signals from said converter, said microprocessor applying said position control signals to said driver and thereby affecting said position of said coupled air damper or valve; and, said microprocessor having means for driving said air damper or valve via said driver to said fail safe position in the presence of said fail safe control signal and including means for generating a reverse position control signal when said position indicative signal falls within a predetermined position band near said predetermined fail safe position and in the presence of said fail safe control signal prior to driving said air damper or valve to said fail safe position.

34. A method for a controller for controlling a fractional horsepower motor used as an actuator and adapted to be coupled to an air damper or a valve, said controller being supplied with power and control input signals and the method comprising the steps of:

providing a microprocessor coupled to and operating in conjunction with a memory;

providing a capacitive energy storage unit;

storing sufficient power in said capacitive energy storage unit from said supplied power to drive said fractional horsepower motor and move said coupled air damper or valve to a predetermined fail safe position upon a loss of said power;

sensing a presence and said loss of said power and generating a fail safe control signal upon said loss of said power;

switching power from one of the supplied power and said capacitive energy storage unit based upon the absence or presence of said fail safe control signal, respectively;

driving said fractional horsepower motor via said microprocessor based upon said control input signals;

continually monitoring a position of said coupled air damper or said valve and generating a position indicative signal;

driving said air damper or valve to said fail safe position in the presence of said fail safe control signal; and reducing the drive applied to said fractional horsepower motor when said position indicative signal falls within a predetermined position band near said predetermined fail safe position and in the presence of said fail safe control signal.

35. A method as claimed 34 wherein the step of monitoring the position includes the steps of electro-mechanically monitoring and electromagnetically monitoring the position of the air damper or valve, the method includes the step of selecting one of the electro-mechanical sensing and electromagnetic sensing as a principle sensing step.

36. A method as claimed in claim 35 including the step of resetting said position indicative signal from the non-selected sensing step with the position indicative signal from the principle sensing step.

37. A method as claimed in claim 34 including the step of reducing the drive applied to said fractional horsepower motor at all times when said position indicative signal falls within a predetermined position band near said predetermined fail safe position.

38. A method as claimed in claim 34 including the step of reversing the drive applied to said fractional horsepower motor when said position indicative signal falls within a further predetermined position band near said predetermined fail safe position and in the presence of said fail safe control signal.

39. A method as claimed in claim 38 including the step of driving said fractional horsepower motor at full speed in the presence of said fail safe control signal prior to the step of reducing the drive.

40. A method as claimed in claim 38 including the step of driving said fractional horsepower motor at full speed in the presence of said fail safe control signal prior to the steps of reversing the drive and reducing the drive.

* * * * *